(12) United States Patent
Kobayashi et al.

(10) Patent No.: US 8,493,536 B2
(45) Date of Patent: Jul. 23, 2013

(54) BEND ALIGNMENT TYPE LIQUID CRYSTAL DISPLAY APPARATUS

(75) Inventors: Kunpei Kobayashi, Tachikawa (JP); Norihiro Arai, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 146 days.

(21) Appl. No.: 13/013,607

(22) Filed: Jan. 25, 2011

(65) Prior Publication Data

US 2011/0115995 A1 May 19, 2011

Related U.S. Application Data

(62) Division of application No. 11/689,938, filed on Mar. 22, 2007, now Pat. No. 8,009,254.

(30) Foreign Application Priority Data

Mar. 29, 2006 (JP) .................................. 2006-091290

(51) Int. Cl.
*G02F 1/1337* (2006.01)

(52) U.S. Cl.
USPC .......................................... 349/139; 349/123

(58) Field of Classification Search
USPC .................................. 349/139, 123
See application file for complete search history.

(56) References Cited

U.S. PATENT DOCUMENTS

| 6,233,034 | B1 * | 5/2001 | Lee et al. | 349/141 |
|---|---|---|---|---|
| 6,433,764 | B1 * | 8/2002 | Hebiguchi et al. | 345/87 |
| 6,469,765 | B1 * | 10/2002 | Matsuyama et al. | 349/143 |
| 6,507,381 | B1 * | 1/2003 | Katsuya et al. | 349/130 |
| 6,512,503 | B1 * | 1/2003 | Kim et al. | 345/87 |
| 6,522,380 | B2 * | 2/2003 | Lee et al. | 349/141 |
| 6,587,170 | B2 * | 7/2003 | Shin et al. | 349/110 |
| 6,657,694 | B2 * | 12/2003 | Ko et al. | 349/141 |
| 6,671,025 | B1 * | 12/2003 | Ikeda et al. | 349/156 |
| 6,781,657 | B1 * | 8/2004 | Kim et al. | 349/129 |
| 6,839,113 | B2 * | 1/2005 | Watanabe et al. | 349/141 |
| 7,027,023 | B2 * | 4/2006 | Okishiro et al. | 345/94 |

(Continued)

FOREIGN PATENT DOCUMENTS

| JP | 8-087013 A | 4/1996 |
|---|---|---|
| JP | 2000-066208 A | 3/2000 |
| JP | 2001-296519 A | 10/2001 |
| JP | 2002-207206 A | 7/2002 |

OTHER PUBLICATIONS

Japanese Office Action dated Sep. 1, 2009, and English translation thereof, issued in counterpart Japanese Application No. 2006-091290.

*Primary Examiner* — Kaveh Kianni
(74) *Attorney, Agent, or Firm* — Holtz, Holtz, Goodman & Chick, P.C.

(57) ABSTRACT

A liquid crystal display apparatus includes a liquid crystal layer sealed between a first substrate and a second substrate opposed to each other. Inner surfaces of the first and second substrates have been subjected to aligning treatment to splay-align liquid crystal molecules. The liquid crystal display further includes electrodes formed on the inner surfaces of the first and second substrates to generate an alignment transition electric field to cause the liquid crystal molecules to transit from splay alignment to bend alignment. The alignment transition electric field includes a vertical electric field in the thickness direction of the liquid crystal layer, and a horizontal electric field in a direction parallel to the inner surfaces of the first and second substrates to twist the liquid crystal molecules between the substrates.

4 Claims, 4 Drawing Sheets

U.S. PATENT DOCUMENTS

| | | | |
|---|---|---|---|
| 7,423,715 B2* | 9/2008 | Hisatake | 349/119 |
| 7,564,510 B2* | 7/2009 | Miyachi et al. | 349/37 |
| 7,724,335 B2* | 5/2010 | Miyachi et al. | 349/141 |
| 7,924,375 B2* | 4/2011 | Chung et al. | 349/114 |
| 2001/0048498 A1* | 12/2001 | Tomioka et al. | 349/123 |
| 2002/0003597 A1* | 1/2002 | Shin et al. | 349/110 |
| 2002/0047973 A1* | 4/2002 | Matsumoto | 349/141 |
| 2002/0080320 A1* | 6/2002 | Suzuki et al. | 349/153 |
| 2003/0025865 A1* | 2/2003 | Takatori et al. | 349/129 |
| 2003/0052847 A1* | 3/2003 | Okishiro et al. | 345/87 |
| 2003/0112393 A1* | 6/2003 | Watanabe et al. | 349/123 |
| 2004/0046903 A1* | 3/2004 | Matsumoto et al. | 349/43 |
| 2004/0057003 A1* | 3/2004 | Yoo et al. | 349/141 |
| 2004/0090582 A1* | 5/2004 | Ikeda et al. | 349/130 |
| 2004/0119924 A1* | 6/2004 | Takeda et al. | 349/129 |
| 2004/0165132 A1* | 8/2004 | Tomioka et al. | 349/123 |
| 2004/0207794 A1* | 10/2004 | Miyachi et al. | 349/143 |
| 2004/0218132 A1* | 11/2004 | Song et al. | 349/145 |
| 2004/0257512 A1* | 12/2004 | Yoo et al. | 349/141 |
| 2005/0018119 A1* | 1/2005 | Takeda et al. | 349/130 |
| 2005/0036096 A1* | 2/2005 | Takatori et al. | 349/156 |
| 2005/0134777 A1* | 6/2005 | Lee et al. | 349/123 |
| 2005/0179847 A1* | 8/2005 | Miyachi et al. | 349/141 |
| 2005/0185105 A1* | 8/2005 | Miyachi et al. | 349/24 |
| 2005/0253990 A1* | 11/2005 | Song et al. | 349/145 |
| 2005/0270449 A1* | 12/2005 | Koma et al. | 349/114 |
| 2005/0275780 A1* | 12/2005 | Hisatake | 349/120 |
| 2006/0012741 A1* | 1/2006 | Mizusako | 349/130 |
| 2006/0044501 A1* | 3/2006 | Mizusako | 349/123 |
| 2006/0066791 A1* | 3/2006 | Mizusako et al. | 349/123 |
| 2006/0066799 A1* | 3/2006 | Mizusako et al. | 349/142 |
| 2006/0238675 A1* | 10/2006 | Zhu et al. | 349/114 |
| 2006/0262261 A1* | 11/2006 | Takeda et al. | 349/130 |
| 2007/0121047 A1* | 5/2007 | Chung et al. | 349/141 |
| 2008/0007665 A1* | 1/2008 | Lyu et al. | 349/38 |
| 2008/0218646 A1* | 9/2008 | Miyachi et al. | 349/37 |
| 2009/0185124 A1* | 7/2009 | Mizusako et al. | 349/139 |
| 2010/0033663 A1* | 2/2010 | Miyachi et al. | 349/138 |
| 2010/0149480 A1* | 6/2010 | Miyachi et al. | 349/185 |

* cited by examiner

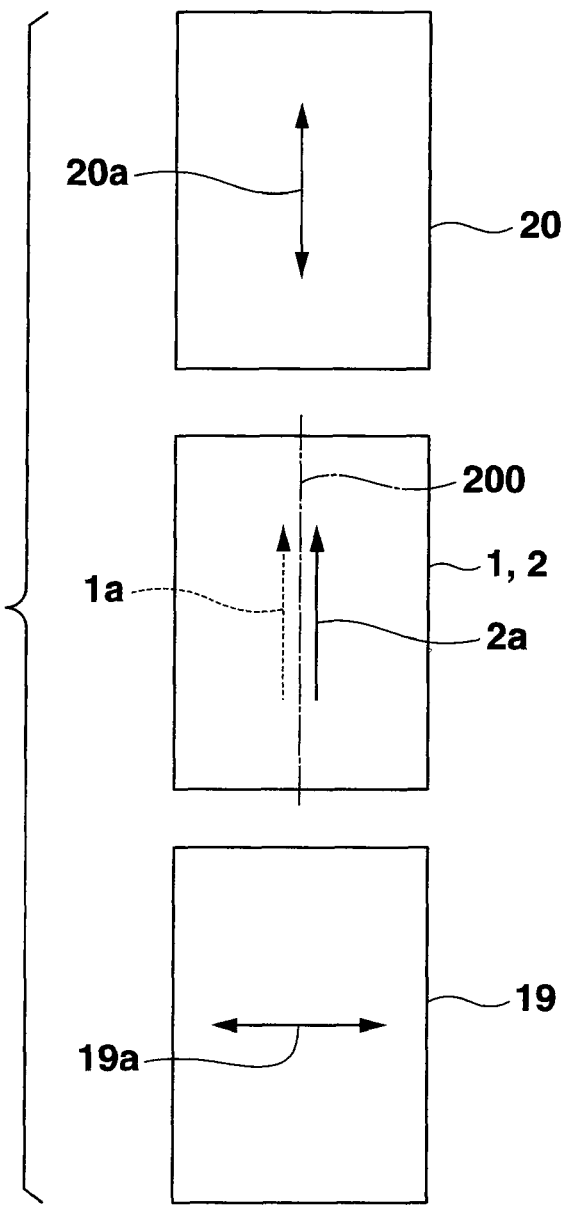

BEND ALIGNMENT TYPE LIQUID CRYSTAL DISPLAY APPARATUS

CROSS-REFERENCE TO RELATED APPLICATIONS

This is a Divisional of U.S. application Ser. No. 11/689,938, filed Mar. 22, 2007 now U.S. Pat. No. 8,009,254, which is based upon and claims the benefit of priority from prior Japanese Patent Application No. 2006-091290, filed Mar. 29, 2006, the entire contents of both of which are incorporated herein by reference.

BACKGROUND OF THE INVENTION

1. Field of the Invention

The present invention relates to a bend alignment type liquid crystal display apparatus.

2. Description of the Related Art

A bend alignment type liquid crystal display apparatus includes a liquid crystal layer in which liquid crystal molecules have a splay alignment in an initial alignment state. After transition from the splay alignment to bend alignment of the liquid crystal molecules, the alignment state of the liquid crystal molecules in the bend alignment is controlled.

The bend alignment type liquid crystal display apparatus includes a liquid crystal layer sealed in a gap between a pair of substrates opposed to each other. Inner surfaces of the substrates have been subjected to aligning treatment to align the liquid crystal molecules of the liquid crystal layer in a splay configuration. The liquid crystal molecules of the liquid crystal layer have a splay alignment in which the major axes of the molecules align in the direction of aligning treatment. The inner surfaces of the substrates are provided with opposing electrodes. Between the electrodes, an electric field to cause the liquid crystal molecules to transit from the splay alignment to the bend alignment is applied at the start, and a driving electric field corresponding to image data is applied after the start.

At the start, in the bend alignment type liquid crystal display apparatus, an electric field which causes the alignment transition is generated between the electrodes of the substrates to transit the alignment of the liquid crystal molecules from the splay alignment to the bend alignment. After that, a driving electric field corresponding to the image data is generated between the electrodes to control the alignment state of the liquid crystal molecules in the bend alignment, thus displaying an image.

In the bend alignment type liquid crystal display apparatus, to cause the liquid crystal molecules to transit from the splay alignment at the start to the bend alignment within a short period of time at a low voltage is sought for.

For this purpose, conventionally, to use a liquid crystal material having a small ratio $K_{33}/K_{11}$ of a splay elastic constant $K_{11}$ to a bend elastic constant $K_{33}$ (see Jpn. Pat. Appln. KOKAI Publication No. 8-87013) and to subject the inner surface of at least one of the substrates to treatment that changes the rising state of the liquid crystal molecules among regions upon application of an alignment transition voltage (see Jpn. Pat. Appln. KOKAI Publication No. 2000-66208) have been proposed.

BRIEF SUMMARY OF THE INVENTION

A liquid crystal display apparatus according to an aspect of the present invention includes a liquid crystal layer sealed between a first substrate and a second substrate opposed to each other, wherein liquid crystal molecules of the liquid crystal layer are nematic liquid crystals having positive dielectric anisotropy. Inner surfaces of the first and second substrates have been subjected to aligning treatment to align the liquid crystal molecules in a splay configuration. The liquid crystal display further includes electrodes formed on the inner surfaces of the first and second substrates to generate an alignment transition electric field to cause the liquid crystal molecules to transit from splay alignment to bend alignment. The alignment transition electric field comprises a vertical electric field in a thickness direction of the liquid crystal layer, and a horizontal electric field in a direction parallel to the inner surfaces of the first and second substrates to twist the liquid crystal molecules between the substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 shows the aligning treatment directions of inner surfaces of a pair of substrates and directions of the transmission axes of a pair of polarization plates in the liquid crystal display apparatus;

DETAILED DESCRIPTION OF THE INVENTION

Figure 1:
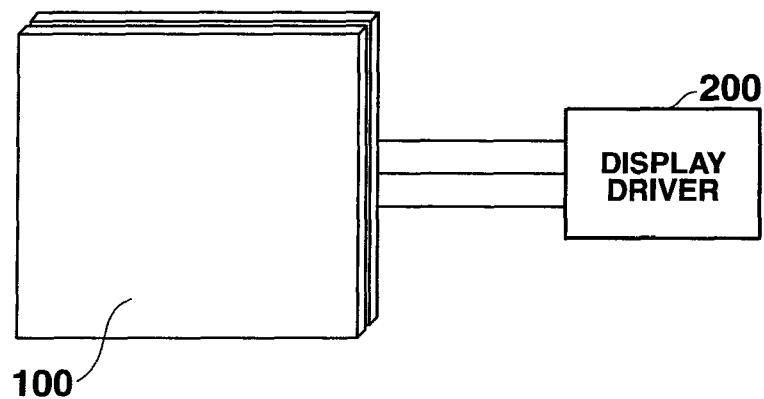
FIG. 1 schematically shows the arrangement of a liquid crystal display apparatus according to an embodiment of the present invention.
Figure 2:
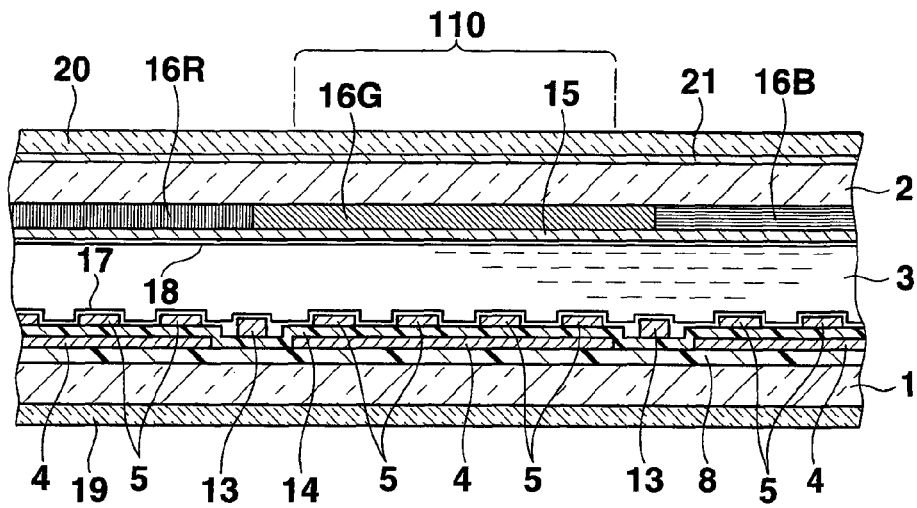
FIG. 2 is a sectional view of part of the liquid crystal display apparatus according to the embodiment of the present invention.
Figure 3:
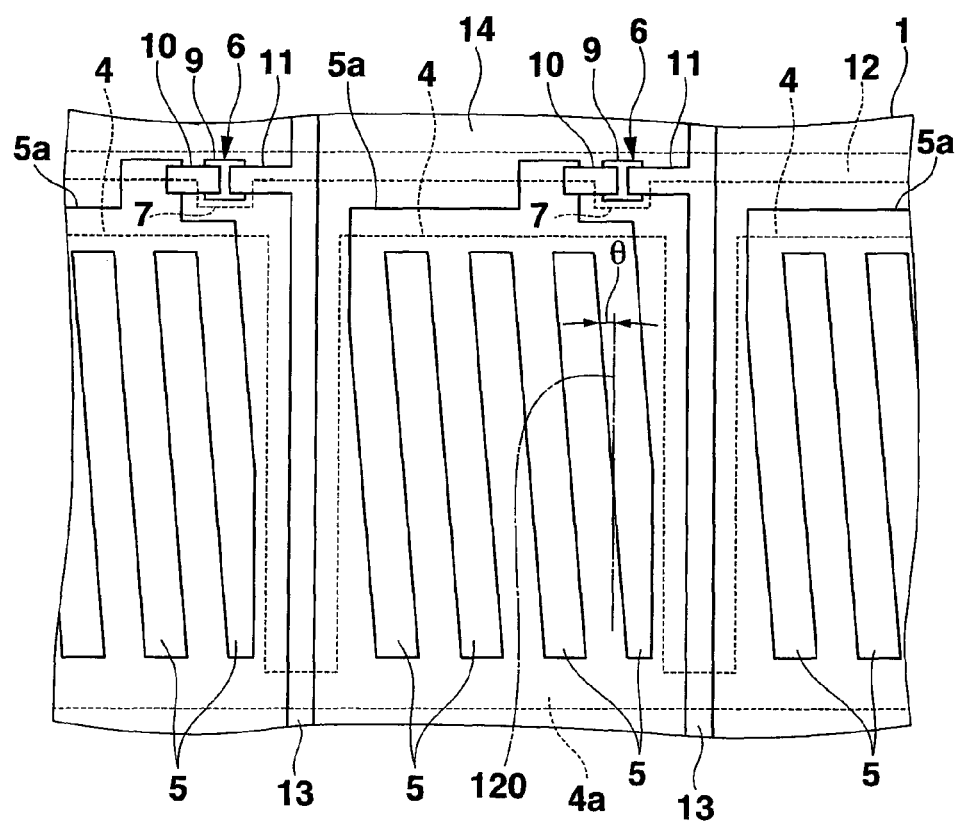
FIG. 3 is a plan view of part of a substrate of the liquid crystal display apparatus.

FIGS. 1 to 4, 5A, 5B, 6A, 7A, and 7B show an embodiment of the present invention. FIG. 1 schematically shows the schematic arrangement of a liquid crystal display apparatus according to the embodiment of the present invention, FIG. 2 is a sectional view of part of the liquid crystal display apparatus, and FIG. 3 is a plan view of part of a substrate of the liquid crystal display apparatus. FIG. 4 shows the directions of aligning treatment done on inner surfaces of a pair of substrates and directions of the transmission axes of a pair of polarization plates in the liquid crystal display apparatus. FIGS. 5A, 5B, 6A, 6B, 7A, and 7B are schematic views each showing a change in alignment state of the liquid crystal molecules between the substrates.

As shown in FIGS. 1 to 3, this liquid crystal display apparatus includes a liquid crystal display device 100 and a display driver 200 to drive the liquid crystal display device 100.

The liquid crystal display device 100 includes a pair of transparent substrates, e.g., first and second substrates 1 and 2, a liquid crystal layer 3, transparent first and second electrodes 4 and 5, a transparent third electrode 15, alignment films 17 and 18, and a pair of polarization plates 19 and 20. The first and second substrates 1 and 2 are opposed to each other via a gap and bonded to each other through a frame-like seal member (not shown). The liquid crystal layer 3 is sealed in a region between the substrates 1 and 2 and surrounded by the frame-like seal member. The first and second electrodes 4 and 5 are formed on one of the inner surfaces of the substrates 1 and 2, e.g., the inner surface of the first substrate 1. The third electrode 15 is formed on the inner surface of the remaining one of the substrates 1 and 2, e.g., the inner surface of the second substrate 2. The alignment films 17 and 18 are formed on the inner surfaces of the substrates 1 and 2 and are subjected to aligning treatment to align liquid crystal molecules 3a of the liquid crystal layer 3 in a splay configuration. The polarization plates 19 and 20 are arranged to sandwich the substrates 1 and 2. The liquid crystal layer 3 comprises nematic liquid crystals having positive dielectric anisotropy.

At the start of the liquid crystal display apparatus, the first to third electrodes 4, 5, and 15 of the liquid crystal display device 100 generate an alignment transition electric field. The alignment transition electric field comprises a vertical electric field (an electric field in a direction substantially parallel to the directions of normal to the first and second substrates) with a predetermined value and a horizontal electric field (an electric field which intersects the vertical electric field and extends in a direction substantially parallel to the substrates surfaces, i.e., the inner surfaces, of the substrates 1 and 2). The vertical electric field serves to cause the liquid crystal layer sealed between the substrates to transit from the splay alignment in an initial state to bend alignment. The horizontal electric field serves to twist the liquid crystal molecules 3a. In this case, the first electrodes 4 serve as auxiliary electrodes to generate the horizontal electric field. After the start of the liquid crystal display apparatus, the second electrodes 5 serve as pixel electrodes and the third electrode 15 serves as a counterelectrode, to generate a driving electric field corresponding to the image data in the thickness direction of the liquid crystal layer 3.

At the start of the liquid crystal display apparatus, the display driver 200 supplies a voltage to generate the alignment transition electric field to the respective electrodes of the liquid crystal display device 100. After the start of the liquid crystal display apparatus, the display driver 200 supplies a voltage to generate an electric field corresponding to the image data in the thickness direction of the liquid crystal layer to at least the second electrodes 5 and third electrode 15.

This liquid crystal display apparatus has pixels 110 which control transmission of light to form one display element. The pixels 110 are arranged in row directions and column directions to form a matrix. The first and second electrodes 4 and 5 are formed on the inner surface of one of the substrates 1 and 2, e.g., the substrate 1 (to be referred to as the rear substrate hereinafter) on a side opposite to the display observation side (upper side in FIG. 1). The first and second electrodes 4 and 5 are insulated from each other and correspond to the pixels 110. The third electrode 15 is formed on the inner surface of the remaining one of the substrates 1 and 2, e.g., the substrate 2 (to be referred to as the front substrate hereinafter) on an observation side, corresponding to the pixels 110.

The first electrodes 4 are formed to correspond to at least the entire range of the pixels 110. The second electrodes 5 are formed on an interlayer dielectric film 14, which covers the first electrodes 4, into shapes each having an area smaller than an area of each pixel 110. The second electrodes 5 respectively oppose the first electrodes 4 at their edges.

The liquid crystal display apparatus is an active matrix display apparatus, which selects and drives the pixels 110 arranged in the matrix by an active device comprising TFTs (Thin Film Transistors) 6. The first electrodes 4 are arranged for each row to correspond to the pixels 110 of the row. The second electrodes 5 are arranged to correspond to the pixels 110 and connected to the TFTs 6 formed on the inner surface of the rear substrate 1.

Each TFT 6 has a gate electrode 7, a gate insulating film 8, an i-type semiconductor film 9, source electrode 10, and a drain electrode 11. The gate electrode 7 is formed on a substrate surface of the rear substrate 1. The gate insulating film 8 is formed almost on the entire surface of the rear substrate 1 to cover the gate electrode 7. The i-type semiconductor film 9 is formed on the gate insulating film 8 to oppose the gate electrode 7. The source electrode 10 and drain electrode 11 are formed on the two side portions of the i-type semiconductor film 9 through n-type semiconductor films (not shown).

The inner surface of the rear substrate 1 is provided with scanning lines 12 to supply gate signals to the TFTs 6 of the respective rows, and signal lines 13 to selectively supply a start signal and image data signal (described later) to the TFTs 6 of the respective columns. The scanning lines 12 are formed on the substrate surface of the rear substrate 1 to be integral with the gate electrodes 7 of the TFTs 6. The signal lines 13 are formed on the gate insulating film 8 and connected to the drain electrodes 11 of the TFTs 6.

The first electrodes 4 comprise conductive films 4a formed on the gate insulating film 8 to correspond to the respective pixel rows. The conductive films 4a are connected to each other in common at their ends. A voltage to generate an electric field with a predetermined strength with respect to the second electrodes 5 is supplied to the conductive films 4a.

According to this embodiment, the portions between those regions of the conductive films 4a which correspond to the respective pixels 110 have small widths. Alternatively, the conductive films 4a may have widths to correspond to the entire areas of the pixels 110 throughout sufficiently large ranges of their entire lengths.

The second electrodes 5 respectively comprise comb-shaped conductive films 5a formed on the interlayer dielectric film 14, which covers the first electrodes 4, to correspond to the respective pixels 110. Each comb-shaped conductive film 5a is patterned into a comb shape having electrode finger portions. The comb-shaped conductive film 5a is connected to the source electrode 10 of the corresponding TFT 6 at one end of its base that joins the respective electrode finger portions.

The interlayer dielectric film 14 is formed almost on the entire surface of the rear substrate 1 to cover the first electrodes 4, TFTs 6, and signal lines 13. Each comb-shaped conductive film 5a is connected to the source electrode 10 of the corresponding TFT 6 through a contact hole (not shown) formed in the interlayer dielectric film 14.

For example, each comb-shaped conductive film 5a has four electrode finger portions formed equidistantly. The electrode finger portions have thin, elongated shapes extending in a direction which is inclined with respect to the vertical direction of the screen of the liquid crystal display apparatus, i.e., a vertical axis 120 of the screen, at an angle θ of 5° to 15° in either the left or right direction.

The third electrode 15 on the inner surface of the front substrate 2 comprises a conductive film opposing the entire arrangement region of the pixels 110. A predetermined countervoltage is supplied to one or more portions of the peripheral portion of the third electrode 15.

This liquid crystal display apparatus is a color image display apparatus having red, green, and blue color filters 16R, 16G, and 16B respectively corresponding to the pixels 110. The color filters 16R, 16G, and 16B are formed on a substrate surface of the front substrate 2, and the third electrode 15 is formed on the color filters 16R, 16G, and 16B.

The inner surfaces of the substrates 1 and 2 are respectively provided with homogeneous alignment films 17 and 18, which cover the first and second electrodes 4 and 5 and the third electrode 15, respectively. The splay aligning treatment of the liquid crystal molecules 3a of the liquid crystal layer 3 is done by rubbing the film surfaces of the alignment films 17 and 18 in the same direction which obliquely intersects the direction of lengths of the respective electrode finger portions of the second electrodes 5 comprising the comb-shaped conductive films 5a at a predetermined angle.

FIG. 4 shows aligning treatment directions 1a and 2a (the rubbing directions of the alignment films 17 and 18) of the inner surfaces of the substrates 1 and 2 and the directions of transmission axes 19a and 20a of the polarization plates 19 and 20 which are arranged to sandwich the substrates 1 and 2.

As shown in FIG. 4, the aligning treatment directions 1a and 2a of the inner surfaces of the substrates 1 and 2 are of the same direction and parallel to each other in a direction which is inclined with respect to the direction of lengths of the respective electrode finger portions of the second electrodes 5, in a direction opposite to the direction of inclination of the electrode finger portions with respect to the vertical axis 120 of the screen, at the angle θ (θ=5° to 15°) which is substantially the same as the angle of inclination of the electrode finger portions with respect to the vertical axis 120, that is, a direction substantially parallel to the vertical axis 120 of the screen. With this aligning treatment, in the initial state, the liquid crystal molecules 3a of the liquid crystal layer 3 have a splay alignment in which the major axes of the molecules align in the aligning treatment directions 1a and 2a of the inner surfaces of the substrates 1 and 2.

One of the polarization plates 19 and 20, e.g., the rear polarization plate 19, is arranged such that its transmission axis 19a is substantially parallel to the aligning treatment directions 1a and 2a. The remaining one of the polarization plates 19 and 20, e.g., the front polarization plate 20, is arranged such that its transmission axis 20a is substantially perpendicular, or substantially parallel, to the transmission axis 19a of the rear polarization plate 19. In this embodiment, the transmission axes 19a and 20a of the polarization plates 19 and 20 are perpendicular to each other to constitute a normally black mode liquid crystal display apparatus.

This liquid crystal display apparatus also has a conductive film 21, arranged between the front substrate 2 and the polarization plate 20 which is arranged on the outer surface of the substrate 2, to block static electricity from the outside (observation side).

Between the second electrode 5 formed on the inner surface of the rear substrate 1 and the third electrode 15 formed on the inner surface of the front substrate 2, at the start of the liquid crystal display apparatus, a vertical electric field with a predetermined value is generated in the thickness direction of the liquid crystal layer 3. The vertical electric field causes the liquid crystal molecules 3a to transit from the splay alignment to the bend alignment. After the start, a driving electric field corresponding to the image data is generated in the thickness direction of the liquid crystal layer 3. Between the first and second electrodes 4 and 5 formed on the inner surface of the rear substrate 1, at the start, a horizontal electric field is generated. The horizontal electric field aligns the liquid crystal molecules of an intermediate layer, excluding the liquid crystal molecules of the liquid crystal layer which is adjacent to the substrate surfaces, i.e., the inner surfaces, of the substrates 1 and 2, with a twist in a plane parallel to the substrate surfaces. The horizontal electric field intersects the direction of the vertical electric field and is substantially parallel to the substrate surfaces.

More specifically, in this liquid crystal display apparatus, at the start, the display driver 200 supplies the start signal with the predetermined voltage within the range of, e.g., 5 V to 10 V to the second electrodes 5 through the signal lines 13 and TFTs 6. The start signal generates the vertical electric field with a strength corresponding to the start signal between the second and third electrodes 5 and 15. At the same time, the display driver 200 supplies a voltage with a predetermined voltage to the first electrodes 4. This generates a horizontal electric field with a predetermined strength between the second and first electrodes 5 and 4, more specifically, between the edges of the electrode finger portions of the second electrodes 5 and those portions of the first electrodes 4 which correspond to portions between the finger electrode portions of the second electrodes 5. An alignment transition electric field comprising the vertical electric field and horizontal electric field causes the liquid crystal molecules 3a of the liquid crystal layer 3 to transit from the splay alignment to the bend alignment. After that, an image data signal is supplied to the second electrodes 5 through the signal lines 13 and TFTs 6. The image data signal generates a driving electric field corresponding to the image data between the second electrodes 5 and third electrode 15. This controls the alignment state of the liquid crystal molecules 3a in the bend alignment to display an image.

Figure 5A:
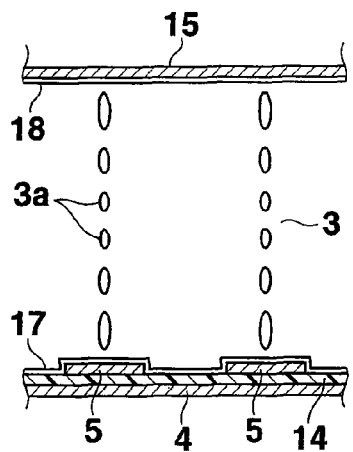
FIG. 5A is an alignment state view, in an initial alignment state, of liquid crystal molecules on a section parallel to the aligning treatment direction.
Figure 5B:
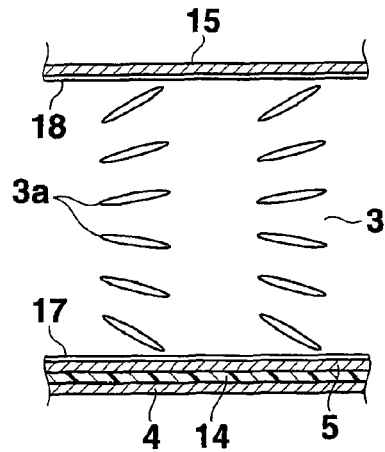
FIG. 5B is an alignment state view, in the initial alignment state, of the liquid crystal molecules on a section parallel to a direction perpendicular to the aligning treatment direction.
Figure 6A:
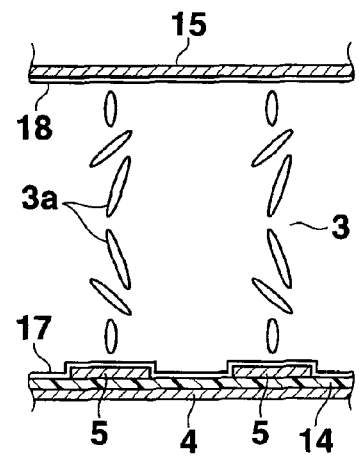
FIG. 6A is an alignment state view, in an alignment transition process, of the liquid crystal molecules on the section parallel to the aligning treatment direction.
Figure 6B:
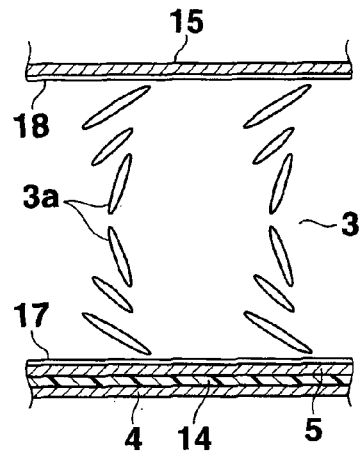
FIG. 6B is an alignment state view, in the alignment transition process, of the liquid crystal molecules on the section parallel to the direction perpendicular to the aligning treatment direction.
Figure 7A:
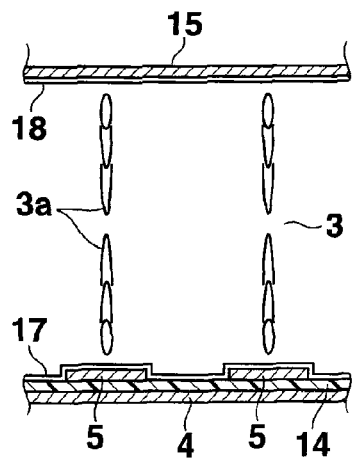
FIG. 7A is an alignment state view, after the alignment transition, of the liquid crystal molecules on the section parallel to the aligning treatment direction.
Figure 7B:
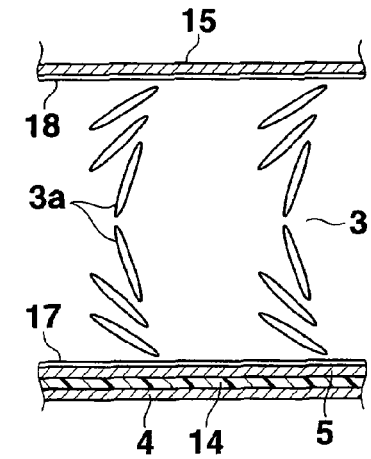
FIG. 7B is an alignment state view, after the alignment transition, of the liquid crystal molecules on the section parallel to the direction perpendicular to the aligning treatment direction.

FIGS. 5A, 5B, 6A, 6B, 7A, and 7B are views each schematically showing a change in alignment of the liquid crystal molecules 3a at the start. FIG. 5A shows the alignment state, in the initial alignment state, of the liquid crystal molecules on a section parallel to the aligning treatment direction. FIG. 5B shows the alignment state, in the initial alignment state, of the liquid crystal molecules on a section parallel to a direction perpendicular to the aligning treatment direction. FIG. 6A shows an alignment state, in an alignment transition process, of the liquid crystal molecules on the section parallel to the aligning treatment direction. FIG. 6B shows an alignment state, in the alignment transition process, of the liquid crystal molecules on the section parallel to the direction perpendicular to the aligning treatment direction. FIG. 7A shows an alignment state, after the alignment transition, of the liquid crystal molecules on the section parallel to the aligning treatment direction. FIG. 7B shows an alignment state, after the alignment transition, of the liquid crystal molecules on the section parallel to the direction perpendicular to the aligning treatment direction.

In this liquid crystal display apparatus, at the start, the vertical electric field is applied between the second electrodes 5 and third electrode 15, and the horizontal electric field is applied between the second electrodes 5 and first electrodes 4. The vertical electric field applies to the liquid crystal molecules 3a a force that raises the liquid crystal molecules 3a from the substrate surfaces. At this time, the liquid crystal molecules adjacent to the inner surfaces of the substrates 1 and 2 maintain the aligning direction and pretilt angle by the alignment regulating force of the alignment films 17 and 18. The liquid crystal molecules located in the intermediate layer of the liquid crystal layer are to rise from the substrate surfaces. Simultaneously, the horizontal electric field in the direction perpendicular to the aligning treatment directions 1a and 2a is applied. The horizontal electric field applies to the liquid crystal molecules of the intermediate layer of the liquid crystal layer a force that twists the liquid crystal molecules in a direction intersecting the aligning treatment direction. Hence, the liquid crystal molecules of the intermediate layer start to align with a twist with respect to the liquid crystal molecules adjacent to the inner surfaces of the substrates 1 and 2. When the alignment of the liquid crystal molecules 3a is twisted in this manner, the intermolecular force among the liquid crystal molecules that are adjacent in the thickness direction of the liquid crystal layer 3 decreases. This allows the liquid crystal molecules to move easily. Thus, the weak vertical electric field applied between the second electrodes 5 and third electrode 15 allows the liquid crystal molecules 3a to change their alignment state easily in accordance with the alignment transition electric field. As a result, a bend alignment state is obtained in which the liquid crystal molecules align such that the rise angles with respect to the surfaces of the substrates 1 and 2 sequentially increase from the vicinities of the substrates 1 and 2 toward the center of the thickness of the liquid crystal layer 3.

In this liquid crystal display apparatus, at the start, the display driver 200 applies the vertical electric field and horizontal electric field to the liquid crystal layer 3. Thus, the liquid crystal molecules 3a of the liquid crystal layer 3 transit from the splay alignment state shown in FIGS. 5A and 5B, to the state shown in FIGS. 6A and 6B in which the splay alignment state and the twist alignment mix, and then to the bend alignment state shown in FIGS. 7A and 7B in which the major axes of the molecules align in the aligning treatment directions 1a and 2a of the inner surfaces of the substrates 1 and 2.

More specifically, in this liquid crystal display apparatus, the alignment transition electric field comprising the vertical electric field and horizontal electric field changes the alignment state of the liquid crystal molecules 3a from the splay alignment at the start to the bend alignment. Hence, according to this liquid crystal display apparatus, the twist alignment of the liquid crystal molecules obtained by the horizontal electric field decreases the intermolecular force among the liquid crystal molecules in the splay alignment state. Thus, the transition of the liquid crystal molecules 3a from the splay alignment at the start to the bend alignment takes place within a short period of time and with a low voltage.

In contrast to this, in a conventional bend alignment type liquid crystal display apparatus, only a vertical electric field in the thickness direction of the liquid crystal layer is applied to the liquid crystal layer in the splay alignment state between the opposing electrodes. After that, the vertical electric field is removed, and the liquid crystal molecules change to the bend alignment due to natural relaxation. Thus, the conventional liquid crystal display apparatus requires a strong vertical electric field, and a long period of time for the alignment transition.

In this manner, a liquid crystal display apparatus according to the present invention comprises a liquid crystal layer sealed between a first substrate and a second substrate opposed to each other, inner surfaces of the first and second substrates having been subjected to aligning treatment to align liquid crystal molecules in a splay configuration, and a plurality of electrodes formed on the inner surfaces of the first and second substrates to generate an alignment transition electric field to cause the liquid crystal molecules to transit from splay alignment to bend alignment. The alignment transition electric field comprises a vertical electric field in a thickness direction of the liquid crystal layer, and a horizontal electric field in a direction parallel to the inner surfaces of the first and second substrates to twist the liquid crystal molecules between the substrates.

In this liquid crystal display apparatus, preferably, the plurality of electrodes comprise first and second electrodes formed on the inner surface of the first substrate to be insulated from each other, and a third electrode formed in the inner surface of the second substrate. The electrodes preferably comprise first and second electrodes formed on the inner surface of the first substrate to be insulated from each other to generate a horizontal electric field in a direction substantially parallel to the inner surface of the first substrate, and a third electrode formed on the inner surface of the second substrate to generate a vertical electric field in the thickness direction of the liquid crystal layer with respect to at least one of the first and second electrodes. In this case, preferably, each first electrode comprises a conductive film with an area corresponding to a pixel to form one display element of the liquid crystal element apparatus, and each second electrode comprises a transparent electrode, formed to overlap the first electrode through an insulating film and including an area smaller than an area of the first electrode, to generate the horizontal electric field between the first electrode and an edge of the second electrode which overlaps the first electrode. Furthermore, each second electrode desirably comprises a comb-shaped conductive film formed on the first substrate and patterned into a comb shape including a plurality of electrode finger portions extending in one direction. Preferably, the electrode finger portions of the comb-shaped conductive film extend in a direction intersecting the direction of aligning treatment of the liquid crystal display apparatus.

Preferably, the liquid crystal display apparatus further comprises a display driver to supply a voltage to generate the alignment transition electric field to the plurality of electrodes when starting the liquid crystal display apparatus, and a voltage to generate an electric field corresponding to image data in the thickness direction of the liquid crystal layer to at least two of the electrodes after the liquid crystal display apparatus is started. Desirably, the plurality of electrodes comprise first and second electrodes formed on the inner surface of the first substrate to be insulated from each other, and a third electrode formed on the inner surface of the second substrate, and the display driver supplies a voltage to generate the vertical electric field to at least the second and third electrodes, and a voltage to generate the horizontal electric field to the first and second electrodes.

A liquid crystal display apparatus according to the present invention comprise first and second substrates arranged to oppose each other at a predetermined gap, first electrodes formed on the inner surface of the first substrate, second electrodes, formed on the inner surface of the first substrate to be insulated from the first electrodes, to generate a horizontal electric field in a predetermined first direction substantially parallel to the inner surfaces of the first and second substrates with respect to the first electrodes, a first alignment film which is formed on the inner surface of the first substrate to cover the first and second electrodes and which has been subjected to aligning treatment in a second direction intersecting the first direction of the horizontal electric field, a third electrode, formed on the inner surface of the second substrate to oppose the first and second electrodes, to generate a vertical field, at least with respect to the second electrodes, in a thickness direction of the gap between the first and second substrates, a second alignment film which is formed on the inner surface of the second substrate to cover the third electrode and which has been subjected to aligning treatment in a direction which is parallel to the second direction of the first alignment film and the same as the direction of the aligning treatment of the first alignment film, a liquid crystal layer sealed in the gap between the first and second substrates and including liquid crystal molecules aligned in a splay configuration in accordance with alignment regulating forces of the first and second alignment films, and a pair of polarization plates provided respectively outside the first and second substrates.

In this liquid crystal display apparatus, preferably, each first electrode comprises a transparent conductive film with an area corresponding to a pixel to form one display element of the liquid crystal element apparatus, and each second electrode comprises a transparent conductive electrode formed to overlap the first electrode through an insulating film and including an area smaller than an area of the first electrode, to generate the horizontal electric field between the first electrode and an edge of the second electrode which overlaps the first electrode. In this case, preferably, each second electrode comprises a comb-shaped conductive film formed on the first substrate and patterned into a comb shape having a plurality of electrode finger portions extending in one direction. Also, desirably, the electrode finger portions of the comb-shaped conductive film extend in a direction intersecting the direction of aligning treatment of the liquid crystal display apparatus.

Preferably, this liquid crystal display apparatus further comprises a display driver to supply a voltage to generate an alignment transition electric field to the first, second, and third electrodes at a start of the liquid crystal display apparatus, the alignment transition electric field comprising a vertical electric field in a thickness direction of the liquid crystal layer and a horizontal electric field in a direction parallel to the inner surfaces of the first and second substrates and to twist the liquid crystal molecules between the substrates, and to cause the liquid crystal molecules to transit from splay alignment to bend alignment. In this case, desirably, the display driver supplies a voltage to generate the vertical electric field to at least the second and third electrodes, and a voltage to generate the horizontal electric field to the first and second electrodes. The liquid crystal display apparatus further desirably comprises a plurality of active elements connected to the second electrodes, each active elements being arranged on the first substrate to correspond to a pixel to form one display element of the liquid crystal display apparatus.

Furthermore, a liquid crystal display apparatus according to the present invention comprises a liquid crystal layer sealed between a first substrate and a second substrate opposed to each other, inner surfaces of the first and second substrates having been subjected to aligning treatment to align liquid crystal molecules of the liquid crystal layer in a splay configuration, a plurality of pixel electrodes formed on the inner surface of the first substrate, a plurality of auxiliary electrodes which are formed on the inner surface of the first substrate to be insulated from the pixel electrodes to generate, with respect to the pixel electrodes, a horizontal electric field to twist the liquid crystal molecules of an intermediate layer, excluding liquid crystal molecules of the liquid crystal layer which are adjacent to the inner surfaces of the first and second substrates, within a plane parallel to the inner surfaces of the first and second substrates, and a counterelectrode, formed on the inner surface of the second substrate to oppose at least the pixel electrodes, to generate a vertical electric field in the thickness direction of the liquid crystal layer with respect to the pixel electrodes.

In this liquid crystal display apparatus, preferably, each auxiliary electrode comprises a conductive film with an area corresponding to the a pixel to form one display element of the liquid crystal display apparatus, and each pixel electrode comprises a comb-shaped conductive film which is formed on the first substrate to overlap the auxiliary electrode through an insulating film and patterned into a comb shape including electrode finger portions extending in one direction to generate the horizontal electric field between the auxiliary electrode and edges of the electrode come portions. In this case, desirably, the liquid crystal display apparatus further comprises a display driver to supply a voltage to generate an alignment transition electric field comprising the horizontal electric field and the vertical electric field to the auxiliary electrodes, pixel electrodes, and counterelectrode when starting the liquid crystal display apparatus, and a voltage to generate an electric field corresponding to image data in the thickness direction of the liquid crystal layer to at least the pixel electrodes and counterelectrode after the liquid crystal display apparatus is started. Desirably, the display driver supplies a voltage to generate the vertical electric field to the pixel electrodes and counterelectrode, and a voltage to generate the horizontal electric field to the auxiliary electrodes and the pixel electrodes. The liquid crystal display apparatus further desirably comprises thin film transistors connected to the pixel electrodes, each pixel electrode being arranged on the first substrate to correspond to a pixel to form one display element of the liquid crystal display apparatus.

According to the above embodiment, of the first and second electrodes 4 and 5 which generate the horizontal electric field to twist the liquid crystal molecules 3a at the start, the first electrodes 4 are formed to correspond to at least the entire area of the pixels 110, and the second electrodes 5 are formed of the comb-shaped conductive films 5a on the interlayer dielectric film 14 which covers the first electrodes 4. However, the present invention is not limited to this. The first and second electrodes 4 and 5 may comprise first and second comb-shaped conductive films having opposite patterns. The electrode finger portions of one of the first and second electrodes 4 and 5 and those of the remaining electrodes may be adjacent to each other via gaps along the surface of the rear substrate 1. In this case, the first and second electrodes respectively comprising the first and second comb-shaped conductive films are arranged to correspond to the pixels 110. The alignment transition electric field is generated between the first and second electrodes and the third electrode 15 formed on the remaining substrate 2.

According to the above embodiment, the electrodes 4 and 5, which generate a horizontal electric field to twist the liquid crystal molecules 3a at the start, are formed on the inner surface of one of the substrates 1 and 2. Alternatively, electrodes which generate a transition electric field to twist the liquid crystal molecules 3*a* at the start may be formed on the inner surfaces of both of the substrates 1 and 2.

Furthermore, according to the above embodiment, the vertical electric field is applied between the second electrodes 5 and third electrode 15, and the horizontal electric field is applied between the first electrodes 4 and second electrodes 5, to apply the electric field that forms the bend alignment state at the start. In the display driving state after this, the first electrodes 4 and second electrodes 5 may be set at the same potential. Alternatively, a display signal corresponding to the image data may be supplied to both of the first electrodes 4 and second electrodes 5. An electric field corresponding to the image data may be applied to the liquid crystal layer between the first and second electrodes 4 and 5 and the third electrode 15.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An alignment transition method for causing liquid crystal molecules in a liquid crystal layer to transit from splay alignment to bend alignment, the liquid crystal layer being provided between a first electrode and a second electrode, the method comprising:

forming a plurality of slits extending in parallel with each other in the second electrode and providing a third electrode disposed to cover the plurality of slits through an insulating film, the third electrode being provided such that the insulating film is interposed between the third electrode and the liquid crystal layer; and causing, when the liquid crystal molecules in the liquid crystal layer exhibit the splay alignment, the liquid crystal molecules to transit from the splay alignment to the bend alignment by applying voltage between the first electrode and the second electrode while applying voltage between the second electrode and the third electrode, wherein the liquid crystal molecules are nematic liquid crystals having positive dielectric anisotropy wherein the plurality of slits are formed to extend in a direction slanting at a predetermined angle with respect to an alignment direction of the liquid crystal molecules which exhibit the splay alignment; wherein the predetermined angle is in a range from 5° to 150°.

2. The method according to claim 1, wherein the plurality of slits are formed in an area corresponding to one pixel.

3. The method according to claim 1, wherein intervals between adjacent slits of the plurality of slits are equivalent.

4. The method according to claim 1, wherein the first electrode and the second electrode are provided in different substrates.

* * * * *